United States Patent [19]
Georgiev et al.

[11] 4,201,340
[45] May 6, 1980

[54] METHOD OF AND A DEVICE FOR HYDRO-AUTOMATIC SPRINKLING WITH SINKING HYDRANTS

[75] Inventors: Vesselin Y. Georgiev; Vladimir S. Mednikarov, both of Sofia, Bulgaria

[73] Assignee: Institute Po Mechanika I Biomechanika, Sofia, Bulgaria

[21] Appl. No.: 904,922

[22] Filed: May 11, 1978

[30] Foreign Application Priority Data

May 12, 1977 [BG] Bulgaria .................................. 36270

[51] Int. Cl.² ........................................... A01G 25/16
[52] U.S. Cl. ................ 239/66; 137/624.11; 239/99
[58] Field of Search ............... 239/66, 99; 137/624.11; 251/230

[56] References Cited

U.S. PATENT DOCUMENTS

| | | | |
|---|---|---|---|
| 2,360,321 | 10/1944 | Griswold | 239/66 |
| 3,018,788 | 1/1962 | Perlis | 239/66 |
| 4,116,216 | 9/1978 | Rosenberg | 239/66 |

Primary Examiner—Robert B. Reeves
Assistant Examiner—Michael J. Forman
Attorney, Agent, or Firm—Karl F. Ross

[57] ABSTRACT

An apparatus for the hydroautomatic sprinkling of land areas with hydrants which rise and lower which comprises a cylinder whose piston is displaceable by the water from one pipeline through either a long stroke or a short stroke depending upon the engagement of a guide with a selected groove in the piston to open a gate permitting water from this line to pass into a selected one of a group of hydrants, to drive the sprinkler upwardly and permit sprinkling. When pressure from another line is admitted to the opposite side of the cylinder the gate is closed.

2 Claims, 3 Drawing Figures

METHOD OF AND A DEVICE FOR HYDRO-AUTOMATIC SPRINKLING WITH SINKING HYDRANTS

FIELD OF THE INVENTION

The present invention relates to an automatic stationary irrigation system using hydroautomatic sprinklers with hydrants whose sprinkler heads are selectively raised and lowered.

BACKGROUND OF THE INVENTION

It is known to rprovide hydrants with raisable and lowerable sprinklers in an irrigating network of such sprinklers which are supplied by a distribution network and which induce sequential operation of the hydrants. All of these sprinklers are retracted simultaneously.

These systems have been found to be sensitive to working of the ground, e.g. by machinery, either resulting in damage to the system or to hydraulic impact upon the hydrants. This may result in disruption of the sequential operation.

In another system, all of the hydrants are raised so that the sprinkler supports lie above the ground and cultivation is impeded.

OBJECT OF THE INVENTION

It is the object of the Invention to provide an improved retractable hydrant system for ground irrigation which does not respond to ground-working or level-change characteristics so as to improperly raise the hydrants and which enables operation of the hydrants free from individual adjustment and from a single location.

SUMMARY OF THE INVENTION

This object is attained with a hydroautomatic device which comprises, in parallel to the feed pipe of the hydrant, a cylinder whose piston is provided with channels around its periphery and which includes a chamber having a predetermined length which receives a head axially connected with a gate communicating with this pipe and the hydrant, so that upon opening of the gate, communication is establised between the pipe and the hydrant to extend the latter and bring about sprinkling. One side of the cylinder is connected to this pipe ahead of the gate while the other side of the cylinder is connected to another pipeline which is pressurized to close the gate.

The channels around the periphery of the piston are engaged by a guide screw rigid with the cylinder and include channels having short strokes of a length equal to the length of the channel and at least one long stroke of a length corresponding to the stroke of the gate. The channels are shaped so as to rotate the piston through a fraction of a revolution with each reciprocation.

An advantage of this system is that a changing ground level does not induce an extension of the hydrant from the ground, prevents crossing of the two water networks, enables control automatically from a single location, renders leakage incapable of affecting the reliability of the system and ensures individual operation of the hydrants of each row.

SPECIFIC DESCRIPTION

Figure 1:
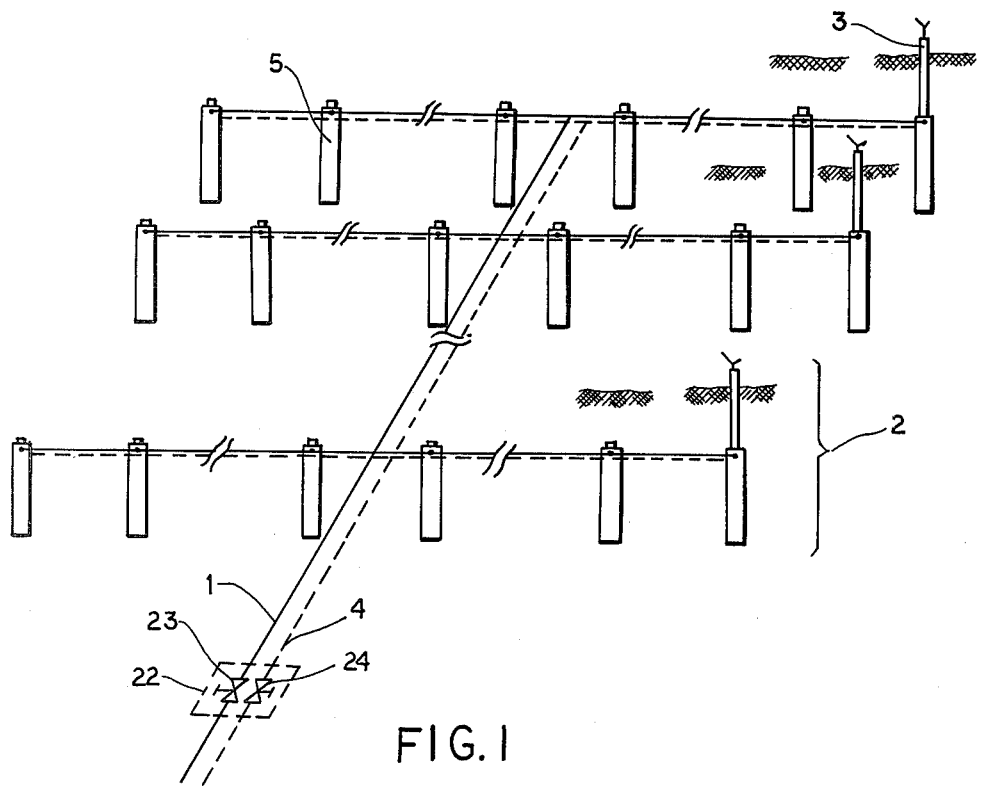
FIG. 1 is a diagram of a sprinkler system with retractable hydrants operated in accordance with the improved method of the present invention.

As seen from FIG. 1, a main water line 1 controlled by a valve 23 supplying a number of rows of retractable hydrants 5 each of which has a support 3 which can be raised from the ground and carries a sprinkler head in the usual manner. One such row has been represented at 2. The additional pipeline is shown at 4 is controlled by the valve 24.

Figure 3:
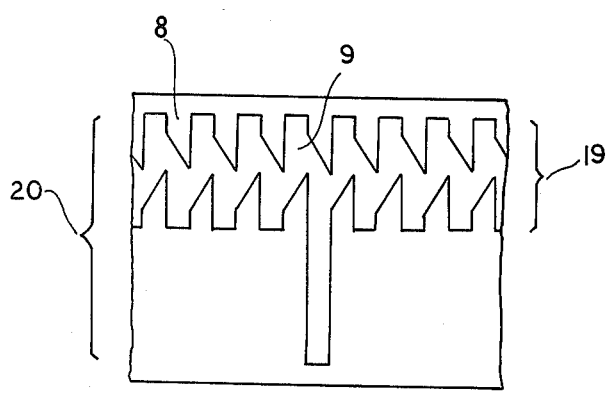
FIG. 3 is a fragmentary developed view showing the grooves or channels formed along the periphery of the piston.
Figure 2:
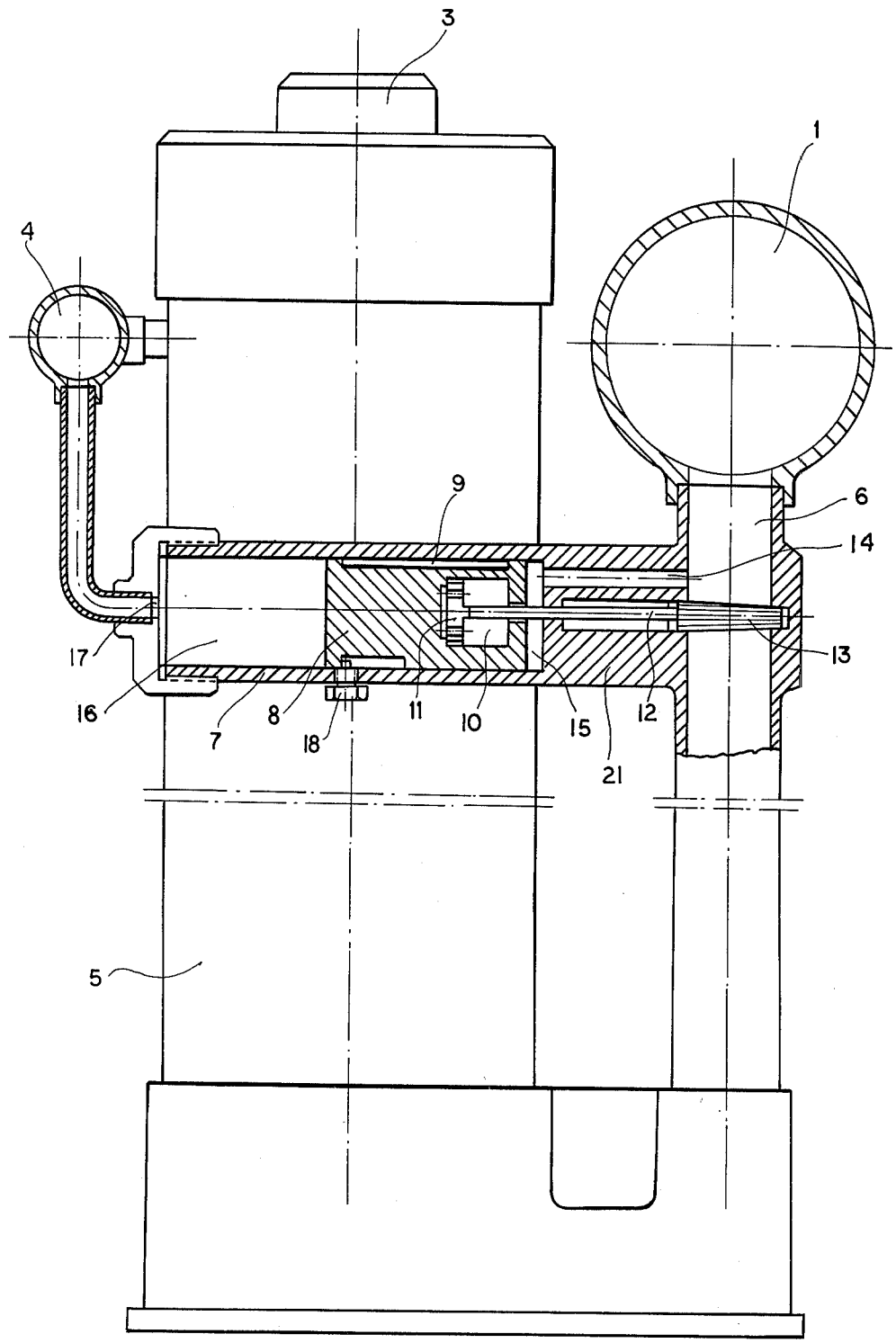
FIG. 2 is a cross section through a hydrant taken parallel to the vertical hydrant axis.

The hydroautomatic device for retracting and extending each hydrant 5 has been shown in FIG. 2 at 21 and comprises a cylinder 7 rigidly mounted on the hydrant at an angle of 90° to the feeder 6 running from pipeline 1 to the hydrant. The cylinder 7 receives a piston 8 which is formed along its periphery with channels 9 (see FIG. 3) cooperating with a guide screw 18 fixed rigidly in the wall of the cylinder 7.

The piston 8 is also formed with a chamber 10 having a predetermined axial length and movably receiving a head 11 which forms a last motion connection with the piston. The head 11 is connected to the gate 13 by a rod 12 along the axis of the cylinder 7.

Ahead of the gate 13 a bore 14 communicates between pipeline 1 and a chamber 15 on the right-hand side of the piston 8. The opposite side of the cylinder 7 has a chamber 16 connected by a bore 17 to the additional pipeline 4.

The channels 9 include short-stroke channels 19 with a length equal to that of chamber 10 and at least one long-stroke channel 20 having a length equal to the length of the chamber 10 plus the effective stroke length of the gate 13.

When the valve 23 at the control point 22 is opened, water is fed through the pipeline 1 and to the individual passages 6 of each hydrant 5, the water pressure being applied through the bore 14 to the space 15 to shift each piston 8 to the left, thereby rotating the piston 8 through one-half the pitch of the channels. If the screw is located in a short-stroke channel, the piston stops without opening the gate 13. When the valve 24 is opened, the fluid pressure in chamber 16 drives the piston 8 to the right, again rotating the system for a new signal.

If, however, the screw 18 is in the long-channel, the piston 8, upon being driven to the left, draws the gate 13 in this direction, opens communication between pipeline 1 and the bottom of the hydrant causing the support 3 to rise and effecting the sprinkling operation.

Pressure in line 4 then drives the piston 8 to the right to close the gate.

In the initial settings, the screw 18 of each hydrant of a row is in engagement with a groove angularly offset from those of the other grooves for successive operation of the hydrants and the number of grooves is one more than the number of hydrants of the row to ensure full retraction.

What we claim is:

1. A ground-irrigation system comprising:
    at least one row of hydrants recessed in the ground and having raisable and lowerable hydraulically displaceable sprinkler supports;

a main pipeline connected with all of said hydrants;

a respective hydroautomatic device at each of said hydrants for causing the sequential raising and lowering of the supports thereof, each hydroautomatic device including:

a respective vertical passage communicating between said main pipeline and the bottom of the respective hydrant, a cylinder affixed to the respective hydrant and having its axis at 90° to the respective passage, a piston shiftable in said cylinder, said piston being formed with a chamber of predetermined axial length, a head movably received in said chamber, a gate connected axially to said head for blocking and unblocking communication through said passage between said main pipeline and the respective hydrant, and means communicating between said passage and one side of each of the cylinders upstream of said gate; and an additional pipeline pressurizable independently of the main pipeline and communicating with the opposite sides of each of the cylinders, and means formed along the periphery of the piston for cooperation with a guide means fixed to the cylinder to provide for rotation of the piston upon a plurality of strokes of said piston coupled with no movement of said gate and at least one stroke of said piston towards the opposite side of said cylinder causing movement of said gate to an unblocking position and subsequent return movement of said piston towards said one side of the cylinder causing blocking movement of said gate.

2. The ground-irrigation system defined in claim 1 wherein said means formed along the periphery of said piston includes a number of channels one more than the number of hydrants in said row and configured to rotate the piston through one-half pitch upon displacement of the piston in the opposite direction, and said guide means includes a guide screw fixed in said cylinder and engaging said channels, said channels including short-stroke channels having a length equal substantially to the length of said chamber and at least one long channel having a length equal to the length of said chamber plus the opening stroke of said gate.

* * * * *